United States Patent
Allender

(10) Patent No.: US 6,239,561 B1
(45) Date of Patent: May 29, 2001

(54) SIGNAL PROCESSING FOR SCANNING BEAM VELOCITY MODULATION

(75) Inventor: Jeffrey Owen Allender, Morristown, IN (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/434,531

(22) Filed: Nov. 5, 1999

(51) Int. Cl.$^7$ .................................................. G09G 1/04
(52) U.S. Cl. ............................................ 315/387; 348/626
(58) Field of Search ................................ 315/387, 403, 315/397, 369, 370; 348/626, 813

(56) References Cited

U.S. PATENT DOCUMENTS

| | | |
|---|---|---|
| 4,197,558 | 4/1980 | Rutishauser ............................ 358/39 |
| 5,196,941 | 3/1993 | Altmanshofer ........................ 358/242 |
| 5,428,269 | * 6/1995 | Hedrick ................................ 315/369 |
| 5,528,312 | 6/1996 | No et al. .............................. 348/626 |
| 5,569,985 | * 10/1996 | Griepentrog ......................... 315/397 |
| 5,587,745 | 12/1996 | Griepentrog et al. ................ 348/626 |
| 5,600,381 | 2/1997 | Griepentrog ......................... 348/626 |

* cited by examiner

*Primary Examiner*—Don Wong
*Assistant Examiner*—James Clinger
(74) *Attorney, Agent, or Firm*—Joesph S. Tripoli; Harvey D. Fried; Francis A. Davenport

(57) ABSTRACT

An apparatus for image enhancement in a cathode ray tube display comprises an amplifier for a scanning velocity modulating signal. The scanning velocity modulating signal has an AC component and a DC value. A feedback circuit is responsive to power dissipation in the amplifier for controlling the AC component and the DC value with a first control signal, and controlling only the DC value with a second control signal.

12 Claims, 4 Drawing Sheets

FIG. 5A/B

SIGNAL PROCESSING FOR SCANNING BEAM VELOCITY MODULATION

BACKGROUND OF THE INVENTION

The apparent sharpness of a cathode ray tube picture may be enhanced by modulation of the scanning beam velocity in accordance with a derivative of the display picture video signal. The derivative signal, or SVM signal, may be derived from a luminance component of the video display signal and is employed to produce scanning beam velocity variations. Slowing the scanning velocity of the electron beam results in a localized brightening of the displayed image, whereas acceleration of the scanning velocity results in a localized darkening of the display. Thus, edges of the displayed image may be perceived to have a more rapid transition or faster rise time by varying the intensity of the display about the edge. This method of sharpness enhancement provides various advantages over that provided by video frequency response peaking, for example, blooming of peaked high luminance picture elements is avoided, and in addition, unwanted video noise occurring within the bandwidth of the video peaking arrangement is not enhanced.

The velocity of the scanning beam may be modulated by an SVM coil, positioned on the CRT neck to generate a supplementary or SVM deflection field. The SVM field, in conjunction with the main deflection field, produces electron beam acceleration or deceleration responsive to the polarity of current in the SVM coil. Thus the amount of beam acceleration or deceleration is proportional to the magnitude of the SVM current, which in turn is proportional to components of the displayed image signal.

Since the SVM signal is generally representative of the high frequency content of the display video signal, it can be appreciated that the SVM coil current is of sufficient magnitude and spectral composition to be readily coupled to yield unwanted, extraneous crosstalk components. Furthermore, any unwanted non-linear processing of the SVM signal will generate harmonically related spectral artifacts which are readily coupled via various crosstalk mechanisms.

SUMMARY OF THE INVENTION

An apparatus for image enhancement in a cathode ray tube display comprises an amplifier for a scanning velocity modulating signal. The scanning velocity modulating signal has an AC component and a DC value. A feedback circuit is responsive to power dissipation in the amplifier for controlling the AC component and the DC value with a first control signal, and controlling only the DC value with a second control signal.

BRIEF DESCRIPTION OF THE DRAWING

FIG. 5A depicts signal V1 responsive to an inventive arrangement.

FIG. 5B depicts the amplitude control signal V3 on the same axes as FIG. 5A.

DETAILED DESCRIPTION

Figure 1:
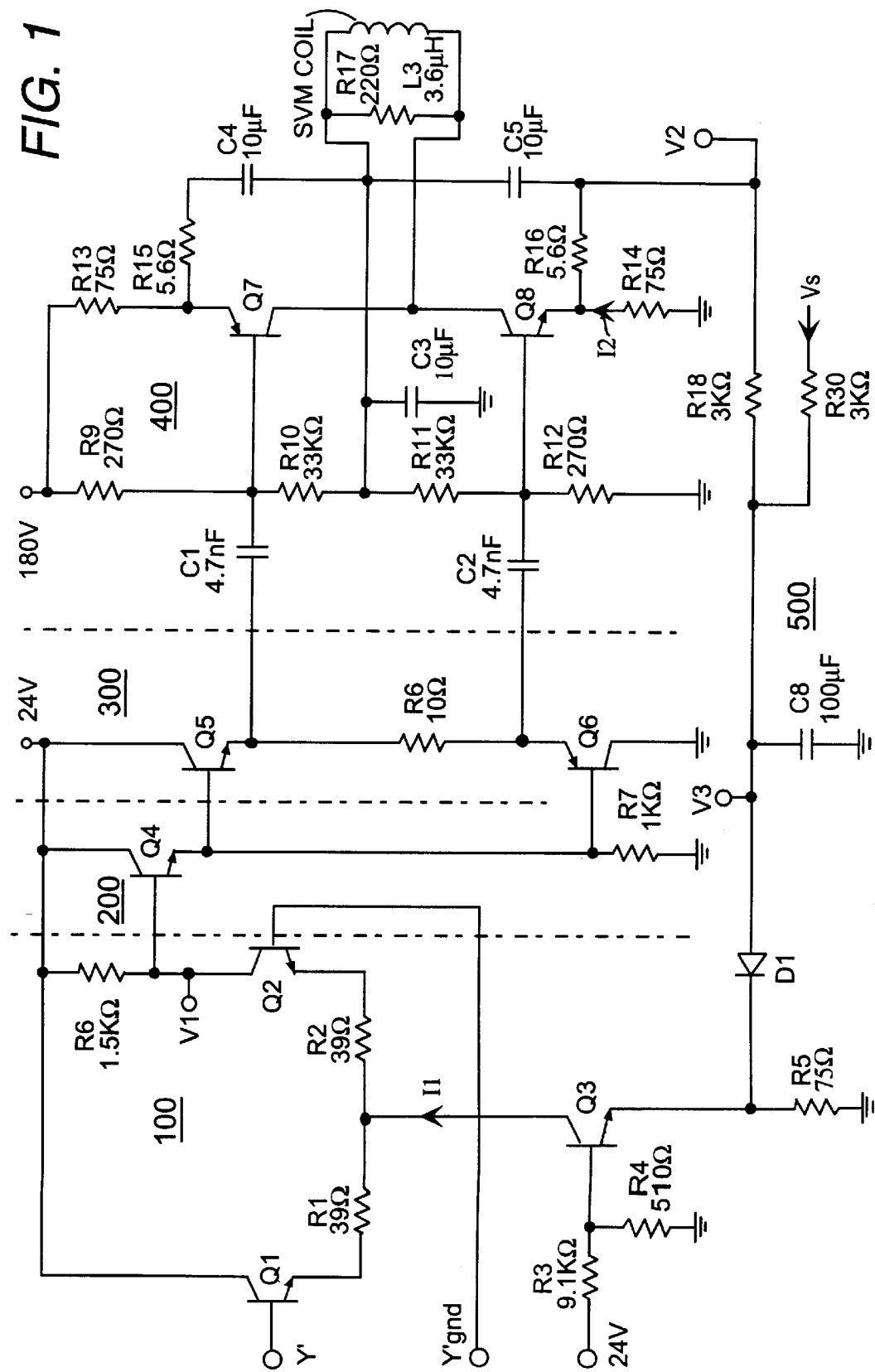
FIG. 1 illustrates an exemplary scanning beam velocity modulation drive amplifier and scanning velocity modulation coil.

FIG. 1 illustrates a scanning beam velocity modulation signal processor and SVM coil drive amplifier. An SVM input signal, Y' and Y'gnd, is coupled to a differential amplifier 100, and can be generated by well known methods, for example by differentiation of the display signal luminance component. Amplifier 100 provides amplification of the SVM input signal and also provides control of output signal V1 amplitude. Buffer amplifier 200 receives output signal V1 and provides separation between the gain determining part of amplifier 100, and driver amplifier 300 which drives power amplifier 400 and SVM coil L3. Current I2 flowing in power amplifier 400 develops a voltage V2 which is coupled to low pass filter 500 to form a control voltage V3. Voltage V3 is fed back to control current I1 in differential amplifier 100. Thus, as current I2 in power amplifier 400 increases, voltages V2 and V3 also increase. The rise in voltage V3 reduces the base emitter bias of transistor Q3 causing current I1, in differential amplifier 100, to decrease. The decrease in differential amplifier current I1 results in a decrease in signal amplitude V1, thus a negative feedback control loop is formed which reduces SVM drive signal amplitude and prevents over dissipation in SVM coil driver amplifier 400. However, it will be appreciated that since the SVM signal amplitude is controlled by differential amplifier 100 in response to voltage V3, such a control signal may be derived responsive to a user sharpness control. Such manual control of SVM signal amplitude or peaking may be facilitated by an open control loop where a user determined control signal Vs is coupled to differential amplifier 100. Furthermore, user controlled sharpness may be facilitated in conjunction with the closed control loop thereby preventing over dissipation in output amplifier 400.

A processed SVM signal Y' is applied to a base electrode of an NPN transistor Q1 which with NPN transistor Q2 forms differential amplifier 100. SVM signal Y'gnd is applied to the base of transistor Q2 which has the collector electrode coupled to a power supply via a resistor R6. An output signal V1 is developed across resistor R6. The collector of transistor Q1 is connected directly to the power supply and the emitter is coupled to the emitter of transistor Q2 via a pair of series connected resistors R1 and R2. The junction of the resistors is connected to the collector of an NPN transistor Q3. The base of transistor Q3 is connected to a potential of approximately 1.2 volts formed at the junction of divider resistors R3 and R4, where resistor R3 is connected to a 24 volt supply and resistor R4 is connected to ground. The emitter of transistor Q3 is connected to ground via resistor R5. Thus, if power control signal V3 is insufficient to turn on diode D1, current I1, and thus the SVM signal amplitude V1 at the collector of transistor Q2 is determined in part by the resistive divider R3 and R4.

The amplitude controlled SVM signal V1, is coupled to buffer amplifier 200, at the base of emitter follower transistor Q4. The collector of transistor Q4 is connected to the power supply and the emitter is connected to ground via resistor R7. The emitter of transistor Q4 is also connected to driver amplifier 300 at the bases of emitter follower connected transistors Q5 and Q6, NPN and PNP respectively. This emitter follower configuration may be considered to function as a push pull follower where transistor Q5 conducts on positive signal excursions and transistor Q6 conducts on negative signal excursions with the center part of the signal, approximately ±600 millivolts, removed or cored. The collector of transistor Q5 is connected to the power supply and the collector of transistor Q6 is connected to ground. The emitters of transistors Q5 and Q6 are connected via a resistor R6 which forms an output load resistor. Output signals from driver amplifier 300 are coupled to power amplifier 400 via capacitors C1 and C2 from the emitters of transistors Q5 and Q6 respectively. Capacitors C1 and C2 provide AC coupling of the SVM signal to power amplifier 400 at the respective bases of SVM coil driver transistors Q7 and Q8.

The SVM coil driver transistors Q7 and Q8 form a complementary amplifier where the base electrodes are biased for nominally class B operation by a resistive potential divider formed by resistors R9, R10, R11 and R12 and coupled between a high voltage supply and ground. Resistor R9 is connected between the high voltage supply and the base of transistor Q7, which also receives the AC coupled SVM signal from capacitor C1. The base of transistor Q7 is also connected to the base of transistor Q8 via series connected resistors R10 and R11. The junction of resistors R10 and R11 is decoupled to ground by capacitor C3 which is also connected to one end of SVM coil L3. Resistor R12 connects the base of transistor Q8 to ground to complete the biasing potential divider. The AC coupled SVM signal from capacitor C2 also connected to the base of transistor Q8.

The collectors of power amplifier transistors Q7 and Q8 are joined to form the SVM output signal which is coupled to SVM coil L3. A resistor R17 is connected across SVM deflection coil L3 to damp resonant effects of the coil, wiring and parasitic capacitance. The low signal end of SVM coil L3 and resistor R17 are connected to the junction of resistors R10, R11 and capacitor C3 which is biased to a potential of approximately half that of the high voltage supply. Power amplifier 400 may be considered as a bridge arrangement where the SVM coil is driven from transistor Q7 and Q8 collectors with the low side of the coil returned to the transistor emitters via low impedance AC coupled series networks, formed respectively by capacitor C4 and resistor R15 to transistor Q7 emitter and capacitor C5 and resistor R16 to the emitter of transistor Q8. Transistor Q7 emitter is supplied with current from the high voltage supply via resistor R13, and transistor Q8 emitter completes the output amplifier current path to ground via resistor R14. Thus in simple terms negative transitions in the SVM signal applied to the base of transistor Q7 base may be considered to cause conduction and charge capacitor C3 towards the supply potential, while positive transitions in the SVM signal applied to transistor Q8 cause capacitor C3 to be discharged towards ground.

A resistor R18 is connected to the junction of capacitor C5 and resistor R16 and couples a voltage V2 formed across resistor R14, in proportion to the current I2 flow in the driver amplifier. The other end of resistor R18 is connected to capacitor C8 which is connected to ground forming lowpass filter 500 and generating DC power limiter voltage V3. The DC power limiter voltage V3 is applied to the anode of diode D1 which conducts when voltage V3 exceeds the diode potential and the positive potential existing at the emitter of transistor Q3. Thus, when diode D1 conducts the base emitter bias of differential amplifier current source transistor Q3 is reduced. The reduction in base emitter bias of transistor Q3 causes current I1 to reduce, thereby reducing the amplitude of SVM signal V1. Similarly sharpness signal Vs may be applied via resistor R30 to low pass filter capacitor C6, and as described for power limiter voltage V3, cause current I1 to change, and so too the perceived picture sharpness by amplitude control of SVM signal V1. Thus, SVM signal amplitude may be controlled in proportion to the current I2 to limit dissipation, and overheating, in the power amplifier transistors Q7 and Q8, or in response to user determined sharpness requirement, or as a combination of both.

Figure 4:
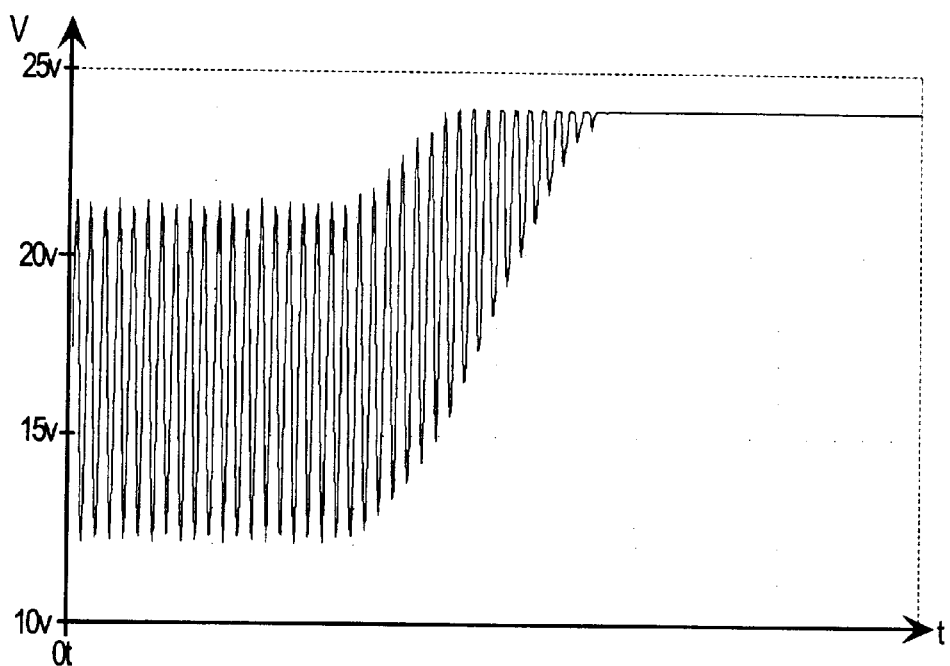
FIG. 4 depicts signal V1 as the SVM signal amplitude is varied.
Figure 4:
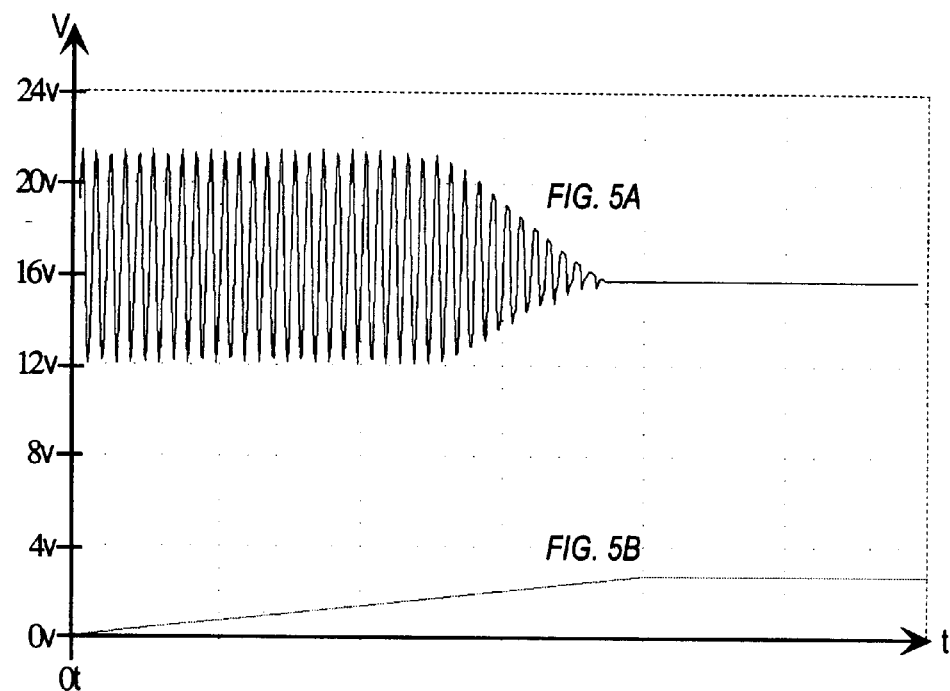

However, although the amplitude of SVM signal V1 may be controlled to limit power dissipation or control display sharpness, the amplitude control mechanism of differential amplifier 100 also produces a corresponding change in the DC component of SVM signal V1 as the amplitude is changed. For example, a reduction in current I1, reduces signal V1 amplitude, and in addition produces less voltage drop across resistor R6. Thus as the amplitude of signal V1 is reduced, the DC component of signal V1 moves closer to the power supply potential, as is illustrated in FIG. 4. Hence as the SVM amplitude is controlled, the succeeding DC coupled amplifier stages 200 and 300 are subjected varying DC bias conditions, with consequential changes in the linearity of the SVM signal or differences in gain with signal polarity. When current I1 approaches nominally zero, the output voltage will nominally reach the supply voltage. This is a problem when the circuitry following the differential amplifier needs to be DC coupled. As the output DC increases, the circuitry following the differential amplifier can develop bias currents that are too high, too low, or non symmetrical. Currents that are too low or too high can cause devices to cutoff or saturate and currents that become non-symmetrical can cause differences in waveform shape, frequency response and impedance values.

Figure 2:
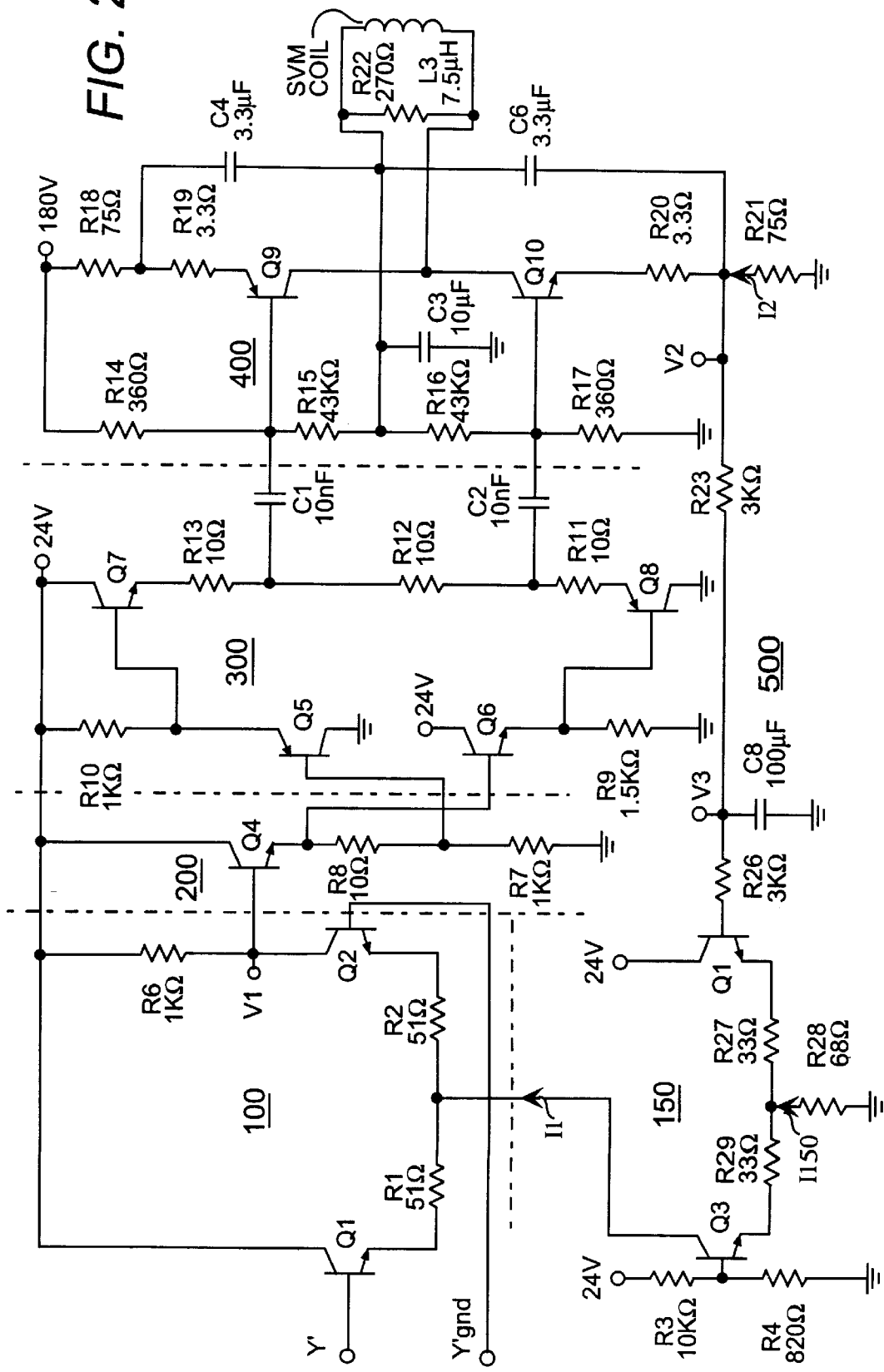
FIG. 2 illustrates an exemplary SVM circuit arrangement for use with higher definition television signals.

The display of high definition television (HDTV) signals imposes additional performance requirements on the operation of scanning velocity modulation systems. FIG. 2 illustrates an SVM signal processor and SVM coil drive amplifier arranged for use with high definition television (HDTV) signals, where additional SVM bandwidth and increased peak coil current are necessary requirements, together with SVM drive signal symmetry, essential for enhanced performance without generation and or emission of spurious, unwanted SVM related harmonics or aliases.

In FIG. 2 a processed SVM signal Y' is applied to a base electrode of an NPN transistor Q1 which with NPN transistor Q2 forms differential amplifier 100. SVM signal Y'gnd is applied to the base of transistor Q2 which has the collector electrode coupled to a power supply via a resistor R6. An output signal V1 is developed across resistor R6. The collector of transistor Q1 is connected directly to the power supply and the emitter is coupled to the emitter of transistor Q2 via a pair of series connected resistors R1 and R2. The junction of the resistors is connected to the collector of an NPN transistor Q3 which with transistor Q1 forms differential amplifier 150. The base of transistor Q3 is connected to a potential of approximately 1.8 volts formed at the junction of divider resistors R3 and R4, where resistor R3 is connected to a 24 volt supply and resistor R4 is connected to ground. The emitter of transistor Q3 is connected to the emitter of transistor Q11 via series connected resistors R27 and R29. The junction of resistors R27 and R29 is connected to ground via resistor R28. The collector of transistor Q11 is connected to the supply voltage and the base is coupled to a gain control voltage V3 via a resistor R26.

As gain control voltage V3 is increased, current I150 is progressively diverted from transistor Q3 to transistor Q11. Thus as the current in transistor Q3 is reduced, so too is collector current I1 which supplies differential amplifier 100. Hence, as voltage V3 increases, current I1 decreases producing a reduction of SVM signal V1 amplitude at the collector of transistor Q2. The collector of transistor Q2 is connected to the power supply via resistor R6, and as described for the circuitry of FIG. 1, the DC component of SVM signal V1 will change as the signal amplitude is controlled. The collector of transistor Q2 is connected to the base of transistor Q4 which forms buffer amplifier 200. The collector of transistor Q4 is connected to the power supply with the emitter coupled to ground via series connected resistors R7 and R8. Resistor R7 is connected to ground with resistor R8 connected to the emitter of transistor Q4 and the base of transistor Q6. The junction of resistors R7 and R8 is connected to the base of transistor Q5. Transistors Q5 and Q7 and transistors Q6 and Q8 respectively are configured to form complementary common emitter amplifiers, represented in FIG. 2 by driver amplifier 300. The emitter of PNP transistor Q5 is connected to the base of complementary NPN transistor Q7, and via resistor R10 to the power supply. The collector of transistor Q5 is connected to ground. Similarly the emitter of NPN transistor Q6 is connected ground via resistor R9, and to the base of complementary PNP transistor Q8, the collector of which is connected to ground. The emitters of transistors Q7 and Q8 are coupled together via series connected resistors R11, R12 and R13, where resistors R11 and R13 are connected to the emitters of transistors Q8 and Q7 respectively. Output signals, for coupling to driver stage 400 are formed at the junction of resistors R12 and R13, and junction of resistors R12 and R11. A capacitor C1 provides AC coupling of the SVM drive signal between the junction of resistors R12 and R13 and the base of power amplifier transistor Q9. Similarly capacitor C2 provides AC coupling between the junction of resistors R12 and R11 and the base of power amplifier transistor Q10. A potential divider, formed by resistors R14, R15, R16 and R17 is connected between a high voltage supply, for example 180 volts and ground potential. The divider generates voltages of approximately 0.7 volts above ground and approximately 0.7 volts below the high voltage supply to bias the bases of output transistors Q10 and Q9 respectively. At the junction of divider resistors R15 and R16 a voltage is generated substantially equal to half the value of high voltage supply. This DC potential is coupled to capacitor C3 and may be considered the source SVM coil current where negative SVM signal transients, coupled via capacitor C1, cause transistor Q9 to turn on and attempt to charge capacitor C1 to the value of the high voltage supply. Similarly, positive SVM signal transients, coupled via capacitor C2, cause transistor Q10 to turn on and attempt to discharge capacitor C1 to ground. However, these SVM signal related currents are coupled via SVM deflection coil L3 to the respective emitters of transistors Q9 and Q10, via low impedance series connected resistor and capacitor networks R19, C5 and R20, C6 respectively, to produce the required velocity perturbations of the scanning electron beam. The average current conducted by power transistors Q9 and Q10 flows to ground via resistor R21 generating voltage V2 in proportion to the current magnitude. Voltage V2 is low pass filtered by series connected resistor R23 and shunt connected capacitor C8 to form voltage V3. The low pass filtered voltage V3 is coupled via series connected resistor R26 to the base of transistor Q11 which forms part of differential amplifier 150. As described previously, as voltage V3 is increased, current I150 is progressively diverted from transistor Q3 which reduces collector current I1 and decreases the amplitude of SVM signal V1 at the collector of transistor Q2. In addition, as described previously, the DC component of signal V1 also changes as the signal amplitude is controlled.

To facilitate enhanced performance required for the display HDTV images requires that the bandwidth of the SVM system be increased, whilst maintaining or improving SVM signal symmetry. In addition, in a projection display apparatus the use of velocity modulation may increase SVM currents and, or increases interconnection requirements, where both mechanisms conflict with a need to reduce or eliminate emissions.

The increased bandwidth required for HDTV images signals, is provided, in FIG. 2, by buffer amplifier 300. Amplifier 300 comprises two pairs of emitter followers which provide complementary, and hence tracking base emitter characteristics. However, the bias current requirements are opposite for these complementary emitter followers. For example, as the amplitude of signal V1 is reduced, the DC component at transistor Q2 increases, so too does the bias current for transistor Q6, whilst the bias current for transistor Q5 decreases. Thus control of SVM amplitude produces corresponding, undesirable, opposing changes in bias currents in the complementary emitter followers Q6, Q8 and Q5, Q7. The changing bias currents result in nonlinear operation and consequential asymmetry between positive and negative transitions in the SVM signal. Such signal asymmetry or nonlinearity inherently generates harmonic products likely to be emitted or radiated both within and beyond the display. Furthermore, asymetry of positive and negative SVM signal transitions give rise to dissimilar electron beam deflection which is manifest as nonsymmetrical edge enhancement. In addition, asymmetric SVM waveforms driving power amplifier 400 give rise to the further generation of higher power, unwanted harmonic products capable of emission or conduction within the display device.

The problem of DC component variation as the SVM signal amplitude is controlled, is eliminated by the inventive circuit arrangement to be described with reference to FIG. 3. A processed SVM signal Y' is applied to a base electrode of an NPN transistor Q1 which with NPN transistor Q2 forms differential amplifier 100. SVM signal Y'gnd is applied to the base of transistor Q2 which has the collector electrode coupled to a power supply via series connected resistors R5 and R6. An output signal V1 is developed across resistors R5 and R6. The collector of transistor Q1 is connected directly the power supply and the emitter is coupled to the emitter of transistor Q2 via a pair of series connected resistors R1 and R2. The junction of resistors R1 and R2 is connected to the collector of an NPN transistor Q3 which with transistor Q11 forms differential amplifier 150. The base of transistor Q3 is connected to a potential formed at the junction of divider resistors R3 and R4, where resistor R3 is connected to a 24 volt supply and resistor R4 is connected to ground. The emitter of transistor Q3 is connected to the emitter of transistor Q11 via series connected resistors R27 and R29. The junction of resistors R27 and R29 is connected to ground via resistor R28. The collector of transistor Q11 is connected, via load resistor R5 of amplifier 100, to the supply voltage. The base of transistor Q11 is coupled to a gain control voltage V3 via a series connected resistor R26.

The operation of differential amplifiers 100 and 150 may be understood by means of an example where gain control voltage V3 is increased at transistor Q11 base and consequently current I150 is progressively diverted from transistor Q3 to transistor Q11. Thus, as the current in transistor Q3 is reduced, so too is collector current I1 which supplies differential amplifier 100 and controls output signal V1 amplitude. Advantageously, the diverted current Icomp from transistor Q11 collector is inventively coupled to the junction of resistors R5 and R6 which form the output load of differential amplifier 100. Thus an exemplary positive increase in the value of control signal V3, results in both currents I1 and I100 decreasing, whilst current Icomp increases to produce a compensatory DC voltage such that SVM signal V1 is reduced in amplitude without any significant corresponding increase in the DC.

In transistor Q3, current I1 is coupled to differential amplifier 100, and is divided between transistors Q1 and Q2. In amplifier 150, transistor Q11 current Icomp, which represents the difference between currents I150 and I1, is coupled as described to the junction of load resistors R5 and R6. Thus current Itot flowing through resistor R5 to the supply is approximately Icomp+I100, however, Itot is less than I150 as a consequence of current I99 in transistor Q1. Thus, as the gain control current I1 in transistor Q3 is controllably reduced, a corresponding complementary current Icomp increases in transistor Q11. The value of load resistor R5 is selected such that when currents I100 and Icomp are combined as Itot, the voltage Vcomp developed across resistor R5 remains substantially constant regardless of the ratios of the currents resulting from SVM signal amplitude control. Thus, as the signal amplitude is reduced in amplifier 100, the compensating increased current flows through part of amplifier 100 load resistor with the result that the DC component remains substantially constant. In addition the differential amplifier AC characteristic are substantially unaffected as the gain of differential amplifier 100 is controlled.

Figure 3:
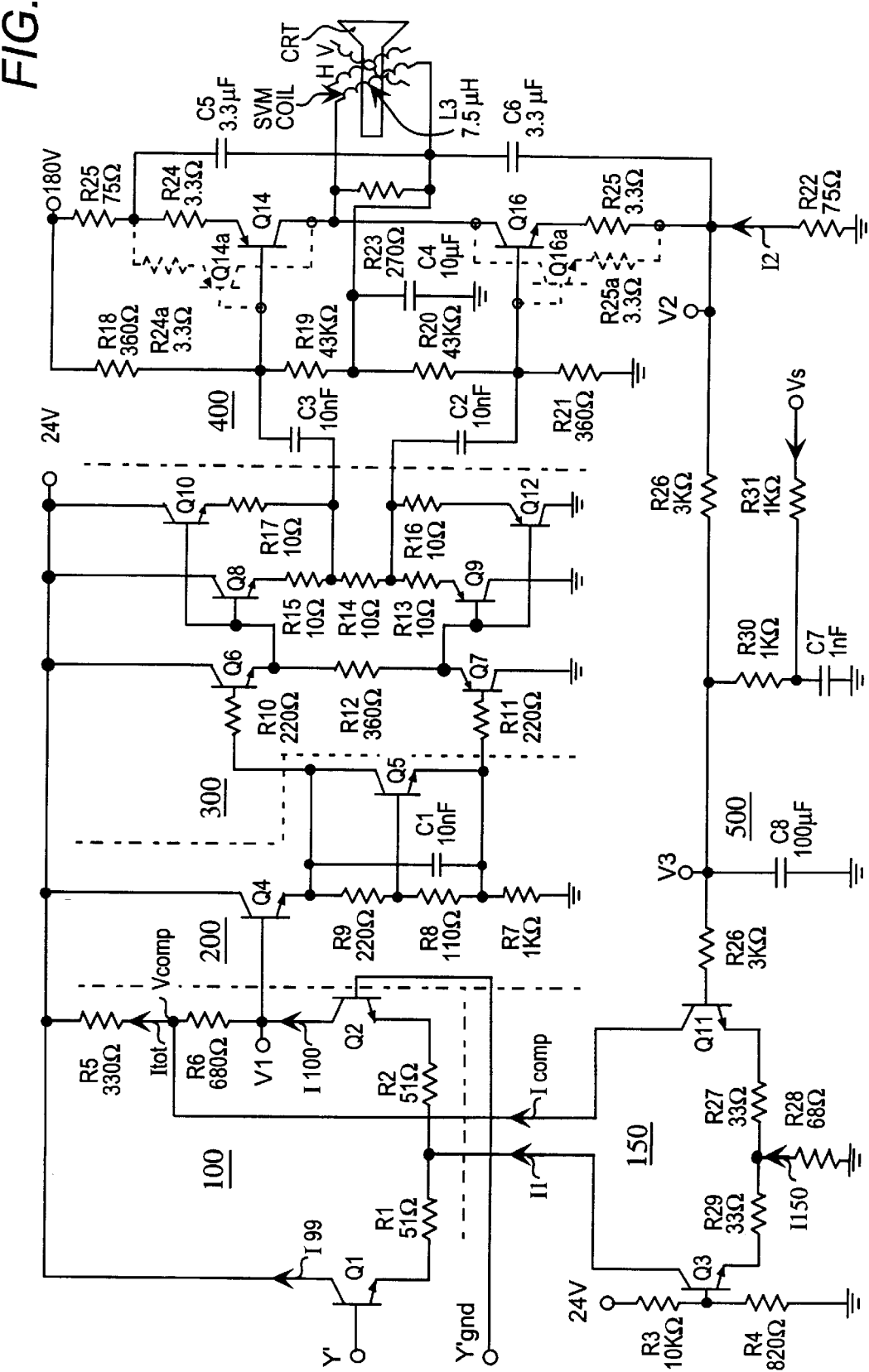
FIG. 3 illustrates an inventive SVM circuit arrangement of SVM signal amplitude control with DC stabilization.

Operation of the inventive arrangement of FIG. 3 is illustrated in FIG. 5A which shows that the DC component of SVM signal V1 is substantially unchanged as the amplitude is controllably varied responsive to control signal V3 depicted on the same axes as FIG. 5B. Thus, the advantageous maintenance of DC component largely eliminates changes in linearity and transient response occurring in subsequent SVM signal amplifying stages. In addition by eliminating linearity and transient response distortions, the SVM signal symmetry is maintained to yield substantially equal pre and post edge enhancement. Furthermore such signal waveform symmetry prevents the formation of dissimilar drive signals with attendant harmonic signal generation.

The amplitude controlled, DC stabilized signal V1 of FIG. 3, is coupled to the base of emitter follower transistor Q4 which, together with transistor Q5 configured as an adjustable diode, forms part of buffer amplifier 200. The collector of transistor Q4 is connected directly to the power supply and the emitter is coupled, via three resistors R9, R8, R7, connected as a potential divider to ground. A capacitor C1 is connected between the collector and emitter of transistor Q5. The emitter of transistor Q4 is connected to the collector of transistor Q5 and, via a series resistor R10 to the base of transistor Q6. The junction of resistors R9, R8 is connected to the base of transistor Q5 with the emitter connected to the junction of resistors R8, R7. The emitter of transistor Q5 is also via a series resistor R11 to the base of transistor Q7. The potential across resistor R8 is approximately one third of the potential across resistors R9, R8 and the collector and emitter of transistor Q5. However, the potential across resistor R8 is set by the base emitter voltage Vbe of transistor Q5, thus the collector to emitter voltage stabilizes at a value substantially three times that of base emitter voltage Vbe. Thus, transistor Q5 may be considered to represent an adjustable reference diode of about 2.1 volts or a Vbe voltage multiplier which establishes a collector to emitter voltage of about three times transistor Q5 Vbe potential. Hence the SVM signals coupled to the bases of respective push pull emitter follower transistors Q6, and Q7 of driver 300 are DC offset, one from the other by a potential of three times transistor Q5 Vbe. The SVM signal between the emitters of parallel connected emitter follower transistors Q8/10 and Q9/12 has been subject to 4 Vbe offset potentials. Since the signals at resistors R10 and R11 were biased to a value of 3 Vbe, the signal at the emitters of transistors Q8/10 and Q9/12 has been subjected to 1 Vbe or approximately 700 millivolts of noise coring. Driver amplifier 300 comprises NPN emitter follower transistors Q6, Q8 and Q10 and PNP emitter follower transistors Q7, Q9 and Q12. The emitters of transistor Q6 and Q7 are coupled together by resistor R12, with the collector of transistor Q6 connected to the supply voltage and the collector of transistor Q7 connected to ground. The bases of parallel connected transistors Q8 and Q10 are connected to the emitter of transistor Q6, and the collectors are connected to the positive supply. The emitters of transistors Q8 and Q10 are each coupled via series resistors R15 and R17 to form an output signal for coupling to capacitor C3 of power amplifier stage 400. Similarly, the bases of parallel connected transistors Q9 and Q12 are connected to the emitter of transistor Q7. The collectors of transistors Q9 and Q12 are connected to ground with emitters of each transistor coupled via series resistors R13 and R16 respectively to form an output signal for coupling to capacitor C2 of power amplifier stage 400. The junction of output resistors R15 and R17 and capacitor C3 is connected to the corresponding components of transistors Q9 and Q12 via resistor R14. When transistors Q7, Q9 and Q12 conduct more they cause current to flow through resistor R14 and capacitor C3 to the base of transistor Q14 which also increases conduction. In the process the connection through capacitor C2 makes transistor Q16 conduct less. Likewise, when transistors Q6, Q8 and Q10 conduct, more current flows through resistor R14 and capacitor C2 to make transistor Q16 conduct more and through capacitor C3 to make transistor Q14 conduct less.

Power amplifier 400 is shown coupled to a SVM deflection coil L3 positioned on a neck region of a cathode ray tube, CRT, which is also shown with vertical and horizontal deflection coils marked V and H respectively. The SVM coil L3 functions in conjunction with horizontal deflection coil to perturb scanning velocity in the direction of the horizontal scan.

Power amplifier stage 400 of FIG. 3 is the same as described previously and shown in FIG. 2. However, in an alternative output arrangement, output power transistors Q14 and Q16 may be replaced with transistor pairs, connected in parallel in a similar manner to transistor pair Q8,10 and transistor pair Q9,12. This alternative, paralleled output power transistor configuration is depicted in FIG. 3 by components Q14a, Q16a, R24a and R25a, all shown by dotted lines. Power dissipation in the output stage is monitored and controlled as described for FIG. 2. However, a sharpness control signal Vs, is shown summed with control signal V3 via resistors R30 and R31. Sharpness control signal Vs may be generated in response to user determined sharpness requirement.

What is claimed is:

1. An apparatus for image enhancement in a cathode ray tube display, comprising;
    an amplifier for generating a scanning velocity modulating signal, said scanning velocity modulating signal having an AC component and a DC value; and,
    a feedback circuit for controlling said AC component and said DC value with a first control signal and controlling only said DC value with a second control signal.
2. The apparatus of claim 1, wherein said feedback circuit reduces said AC component amplitude responsive to an increase in said first control signal.

3. The apparatus of claim 1, wherein said feedback circuit causes complementary changes to said AC component and said DC value responsive to power dissipation in said amplifier.

4. The apparatus of claim 1, wherein said feedback circuit separately controls said amplifier to reduce power dissipation in said amplifier by reducing said AC component amplitude while maintaining said DC value.

5. The apparatus of claim 1, wherein, responsive to power dissipation in said amplifier, said feedback circuit generates said first control and second control signals with complementary values.

6. The apparatus of claim 1, wherein said first control signal controls said amplifier to control said AC component amplitude said second control signal generates a DC value within s aid amplifier to maintain said DC value as said AC component amplitude is varied.

7. The apparatus claim 1, wherein said feedback circuit is additionally responsive to a signal representative of a user determined enhancement setting.

8. The apparatus claim 1, wherein said amplifier coupled for generating a drive signal in a coil to modulate a scanning beam velocity, said drive signal comprising complementary waveform polarities which maintain a substantially symmetrical waveform shape as said amplitude is varied.

9. A cathode ray tube display apparatus, comprising;

a source of a signal representative of a display signal;

an amplifier for amplifying said representative signal and generating an output signal with a controllable amplitude and a DC value;

a power amplifier receiving said output signal and generating a drive signal for modulating an electron beam velocity responsive to said controllable amplitude of said output signal; and, a sensor generating a control signal responsive to current in said power amplifier and coupled to said amplifier for controlling said output signal amplitude, wherein an increase in said current causes said control signal to reduce said output signal amplitude while maintaining said DC value substantially constant.

10. The display apparatus of claim 9, wherein said drive signal maintains a waveform shape as said amplitude is controllably varied.

11. The display apparatus of claim 9, wherein said drive signal comprises complementary waveform polarities maintaining a substantially symmetrical waveform shape as said amplitude is varied.

12. The display apparatus of claim 9, wherein said drive signal comprises complementary waveform polarities having substantially equal magnitudes as said amplitude is varied.

* * * * *